April 6, 1965  A. G. DAHLSTROM  3,176,974
QUICK ADJUSTABLE CLAMP
Filed May 13, 1963
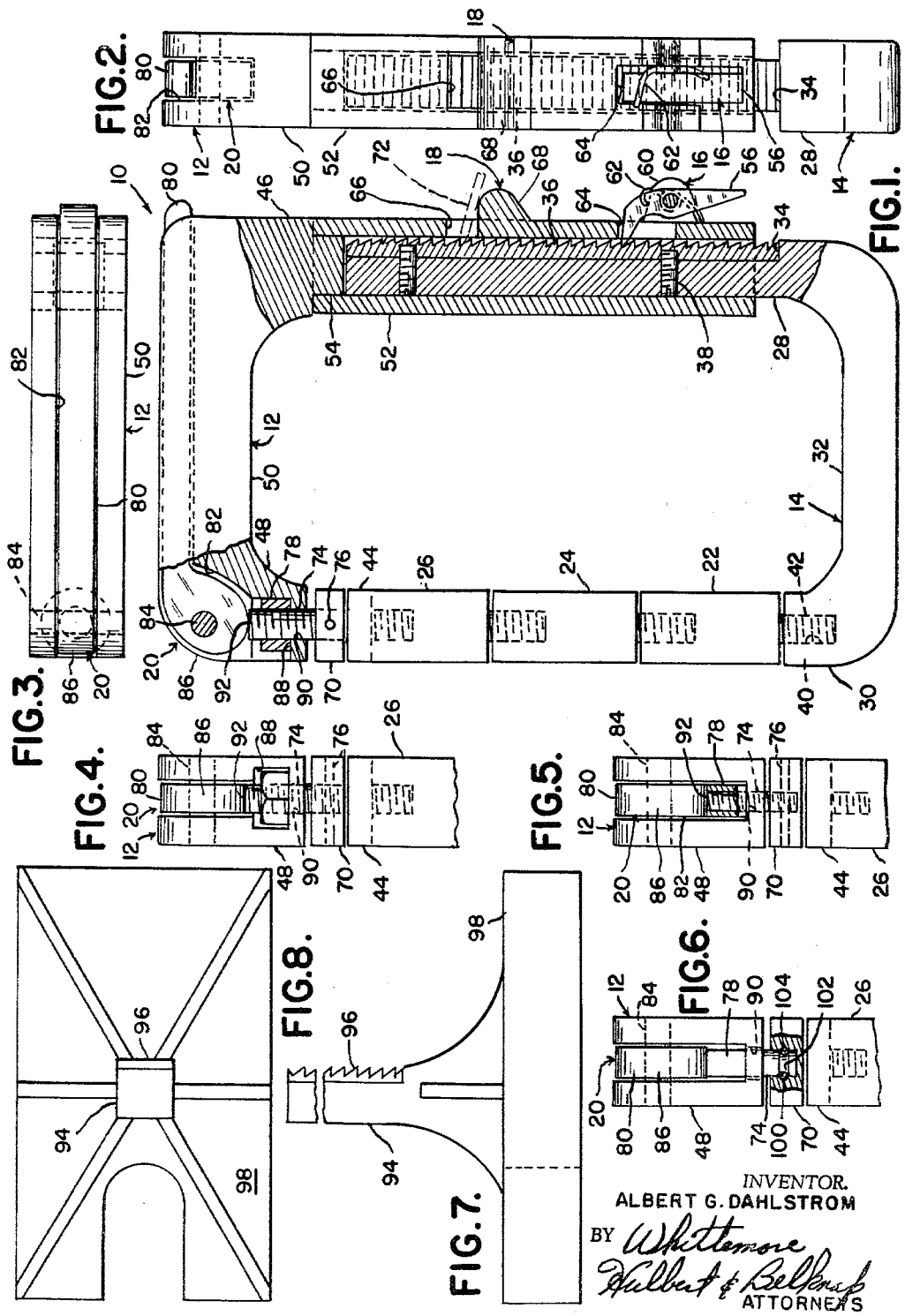
INVENTOR.
ALBERT G. DAHLSTROM
BY Whittemore
Hulbert & Belknap
ATTORNEYS

United States Patent Office 3,176,974
Patented Apr. 6, 1965

3,176,974
QUICK ADJUSTABLE CLAMP
Albert G. Dahlstrom, 11150 Morang, Detroit, Mich.
Filed May 13, 1963, Ser. No. 279,854
6 Claims. (Cl. 269—215)

The invention relates to holding tools and refers more specifically to a quick adjustable clamp.

In the past clamps, such as C-clamps and the like have generally had a very short adjustment or required a considerable amount of time to adjust from one end of their adjusting range to the other. In addition, adjustment of prior clamps has usually required rotation of a clamping member producing a twist on a clamped article. The rotation has usually been produced by another member which has often interfered with a workpiece or adjacent machinery.

Further adjustable clamps of the past have usually required two-handed operation which often necessitated two workmen where one would have been sufficient had one-handed clamp operation been possible. Such use of workmen is not in keeping with the present trend toward automation and the high cost of labor.

It is therefore an object of the present invention to provide improved quick adjustable clamp structure.

Another object is to provide clamp structure as set forth above including means for permitting unrestricted movement of opposed clamping surfaces toward each other and selectively restricting movement of said clamping surfaces away from each other.

Another object is to provide clamp structure as set forth above including means for facilitating movement of the opposed clamping surfaces toward each other in a coarse clamping adjustment.

Another object is to provide clamp structure as set forth above and further including apparatus for moving one of the opposed clamping surfaces toward the other in a fine clamping adjustment.

Another object is to provide clamp structure as set forth above and further including means for positioning one clamping surface closer to the other to minimize a required adjustment.

Another object is to provide a quick adjustable clamp which is simple in construction, economical to manufacture and efficient in use.

Other objects and features of the invention will become apparent as the description proceeds, especially when taken in conjunction with the accompanying drawings, illustrating preferred embodiments of the invention, wherein:

FIGURE 1 is a partly broken away side view of a quick adjustable clamp constructed in accordance with the invention.

FIGURE 2 is a view of the clamp illustrated in FIGURE 1 taken in the direction of arrow 2 in FIGURE 1.

FIGURE 3 is a view of the clamp illustrated in FIGURE 1 taken in the direction of arrow 3 in FIGURE 1.

FIGURE 4 is a partial view of the clamp illustrated in FIGURE 1 taken in the direction of arrow 4 in FIGURE 1.

FIGURES 5 and 6 are partial views of modifications of the clamp illustrated in FIGURE 1 which are similar to the partial view of the FIGURE 1 clamp illustrated in FIGURE 4.

FIGURE 7 is a broken elevation view of one member of a modified clamp similar to the clamp of FIGURE 1.

FIGURE 8 is a top view of the modified clamp member illustrated in FIGURE 7.

With particular reference to the figures of the drawings, one embodiment of the present invention will now be considered in detail.

As shown in FIGURE 1 the quick adjustable clamp 10 is a C-clamp comprising an upper member 12 and a lower member 14 which are held in assembled relation by the pawl and ratchet structure 16. Structure 18 is provided to facilitate urging the members 12 and 14 toward each other to provide a coarse clamping adjustment. Fine clamping adjustment is provided by means of the eccentric structure 20. The inserts or spacers 22, 24 and 26 are provided to minimize the clamping adjustment necessary in any given clamping operation.

More specifically the lower member 14 of the clamp 10 is a U-shaped member including posts 28 and 30 connected by a transverse portion 32. Post 28 includes an offset 34 in one side thereof to permit the attachment thereto of the ratchet plate 36 by convenient means, such as screws 38.

The other post 30 is provided with a threaded recess 40 into which the threaded end 42 of the lower insert or spacer 22 is screwed. Additional inserts 24 and 26 may be added to the post 30 to increase the length of the post 30, as shown. The end insert 26 is provided with a clamping pad 44 which of course could be screwed directly into the threaded recess 40 of the post 30 to provide a clamp 10 having a wide opening.

The upper member 12 of clamp 10 is also a U-shaped member including the posts 46 and 48 connected by a transversely extending portion 50. As shown best in FIGURES 1 and 2 post 46 is extended by means of a sleeve 52 which may be connected to the reduced cross section end portion 54 of the post 46 by convenient means, such as welding. The internal cross section of sleeve 52 is substantially the same as the external cross section of the combined post 28 and ratchet plate 36.

A pawl 56 is pivotally supported on pivot pin 58 extending between the brackets 60 secured to sleeve 52 by convenient means, such as welding. Pawl 56 is spring pressed in a counterclockwise direction by the spring 62 and extends through the opening 64 in sleeve 52 to engage the ratchet teeth on the ratchet plate 36. Thus as the upper member 12 of the clamp 10 is moved toward the lower member 14 with the sleeve 52 extending over the post 28 and ratchet plate 36, the pawl 56 will be cammed over the teeth on the ratchet plate 36.

The pawl 56 in operation will not allow the upper member 12 of the clamp 10 to be moved away from the lower member 14 as long as it is engaged with the ratchet plate 36. To permit such movement of the upper member 12 the pawl must be manually moved in a clockwise direction in opposition to the spring 62.

The means 18 for providing a coarse clamping adjustment comprises an opening 66 through the sleeve 52 and an abutment 68 provided on the sleeve 52 immediately below the opening 66. Thus, after the members 12 and 14 of the clamp 10 have been moved toward each other to loosely clamp a workpiece (not shown) between the clamping pads 44 and 70 coarse clamping of the workpiece may be accomplished by means of a screwdriver 72, indicated in dotted lines since it forms no part of the invention, inserted in the opening 66 so that the tip thereof is engaged with the teeth of the ratchet plate 36 and used as a lever against the abutment 68 to move the members 12 and 14 of the clamp 10 toward each other and thus change the position of the pawl 56 on the ratchet plate 36.

The eccentric structure 20 for completing a fine clamping adjustment comprises a clamping pad 70 which may be pivotally supported from a threaded member 74 by means of a pivot pin 76, the nut 78 securing the threaded member 74 to the post 48 for axial movement with respect thereto and the lever 80 pivotally secured in the slot 82 by the pivot pin 84 and having the eccentric camming surface 86 thereon in contact with the end 92 of the threaded member 74. The nut 78 is secured in a pocket or chamber 88 in post 48 and is movable axially of the member 74 therein. End 92 of the threaded member 74 is peened to prevent withdrawal of member 74 from the nut 78.

As shown in the modification of FIGURE 5 wherein the same reference characters are used to denote the same elements as in FIGURES 1-4, the nut 78 is thin. In the modification of FIGURE 5 the nut 78 is positioned in a continuation of the slot 82 provided to receive the lever 80 to eliminate the necessity of pocket 88 in the clamp 10 illustrated in FIGURES 1-4.

The same reference characters are also used to denote the same or similar elements in the modified eccentric structure 20 illustrated in FIGURE 6. In the FIGURE 6 construction the member 74 is provided with a head 78 having the same configuration as the thin nut 78. Nut 78 is thus eliminated. Assembly of the nut 78 and threaded member 74 and peening of the end of the threaded member are thus eliminated in the FIGURE 6 modified eccentric structure.

Also in the FIGURE 6 construction the clamping pad 70 is secured to the threaded member 74 by the O-ring 100 in the annular recesses 102 and 104 rather than by the pin 76.

Thus in operation of eccentric structure 20, with a workpiece clamped between the clamping pads 44 and 70 the threaded member 74 will be pushed into engagement with the eccentric camming surface 86 with the lever 80 positioned in a counterclockwise position. Lever 80 is then moved in a clockwise position to urge the threaded member out of the axial opening 90 in post 48 to provide a desired fine clamping adjustment.

In over-all operation lever 80 secured to the member 12 is rotated in a counterclockwise direction. The part 12 of the clamp 10 is moved toward the part 14 thereof with the sleeve 52 sleeved over the post 28 and with the workpiece positioned between the clamping pads 44 and 70 after a required number of inserts 22, 24 and 26 have been added to the member 14. Light clamping pressure is thus produced and the pawl 54 engages the teeth of the ratchet plate 36 to hold the light clamping pressure.

A screwdriver is then inserted in the opening 66 in sleeve 52 into engagement with the teeth of the ratchet plate 36 and is rotated clockwise about the abutment 68 on the sleeve 52, as shown in FIGURE 1, to urge the members 12 and 14 of the clamp 10 toward each other and apply a coarse clamping adjustment to the workpiece between the clamping pads 44 and 70.

A final fine clamping adjustment is then applied by means of rotating the lever 80 in a clockwise direction due to the engagement of the eccentric cam surface 86 thereof with the end 92 of the threaded member 74.

It will thus be seen that a quick adjustable clamp has been disclosed which permits rapid initial adjustment into light clamping pressure and provides thereafter means for coarse adjustment of clamping pressure and fine adjustment thereof. Further the structure disclosed is particularly simple, economical and efficient.

While one embodiment and a modification of the present invention have been disclosed in detail, it will be understood that other modifications and embodiments of the invention are contemplated. For example, as shown in FIGURES 7 and 8, the lower member 14 of the quick adjustable clamp may be a post 94 having a ratchet plate 96 secured thereto which post is rigidly supported on a base 98 which may be secured to or integral with the bed of a machine. With such structure the workpiece would be clamped between a clamping pad 70 as before and the base 98. Also, the pawl 56 and ratchet plate 36 could be replaced by convenient one-way friction means as will be understood by those in the clamping art. It is therefore the intention to include all such modifications and embodiments as are encompassed by the appended claims within the scope of the invention.

What I claim as my invention is:

1. A C-clamp comprising a first U-shaped member having a connecting portion between two legs including an outer surface on the side thereof remote from the legs one leg of which is substantially longer than the other and forms a post having an outer surface remote from the other leg of the first U-shaped member, a linear ratchet member extending longitudinally of and secured to the other surface of the post, a second U-shaped member one leg of which is longer than the other and is hollow and forms a sleeve open at only one end to receive the post of the first U-shaped member and guide said post on movement thereof into or out of the sleeve, said sleeve having an outer wall remote from the other leg of the second U-shaped member, an opening through the outer wall of said sleeve, a pawl, means pivotally mounting the pawl on said outer sleeve wall over said opening in the outer wall of the sleeve, means biasing the pawl through the opening in the sleeve wall into engagement with the ratchet member on the post of the first U-shaped member, a slot extending longitudinally of the connecting portion of the second U-shaped member in the outer surface thereof, a lever having a camming surface thereon adjacent the other leg of the second U-shaped member pivotally mounted in said slot, clamping means secured to the other leg of the first U-shaped member and extending toward the other leg of the second U-shaped member with the post of the first U-shaped member inserted within the sleeve of the second U-shaped member and clamping means secured to the other leg of the second U-shaped member in engagement with the camming surface of said lever for movement toward the clamping means carried by the other leg of the first U-shaped member on pivotal movement of said lever into the slot in the connecting portion of the second U-shaped member.

2. Structure as set forth in claim 1 and further including a second opening through the outer wall of said sleeve and an abutment extending outwardly of the outer wall of said sleeve and constructed integrally therewith at the side of the second opening adjacent the open end of the sleeve.

3. Structure as set forth in claim 1 and further including removable spacers positioned between the end of the other leg of the first U-shaped member and the clamping means secured to the second U-shaped member for limiting the necessary adjustment of the clamp.

4. Structure as set forth in claim 3 wherein the second clamping means includes a chamber in the other leg of the second U-shaped member in communication with the slot in the connecting portion thereof, a nut positioned within the chamber, a threaded stud received in said nut and a clamping pad pivotally secured to the other end of said threaded stud.

5. Structure as set forth in claim 4 wherein the chamber has the same transverse dimension as the slot and is an extension thereof.

6. Structure as set forth in claim 1 wherein the clamping means includes an extension of the slot in the connecting portion of the second U-shaped member into the other leg of the U-shaped member, a headed stud extending outwardly of the end of the other leg of the second U-shaped member with the head thereof in the extended portion of the slot, a clamping pad and O-ring means securing the other end of the stud to the clamping pad.

References Cited by the Examiner

UNITED STATES PATENTS

| | | | |
|---|---|---|---|
| 565,799 | 8/96 | Rumford | 248—159 |
| 754,346 | 3/04 | Renouf | 81—134 |
| 1,700,334 | 1/29 | Puterbaugh | 269—249 X |
| 2,179,896 | 11/39 | Neville | 249—146 X |
| 2,194,138 | 3/40 | Crawford | 269—236 X |

FOREIGN PATENTS 476,405  10/4  France.

ROBERT C. RIORDON, *Primary Examiner.*

FRANK SUSKO, *Examiner.*